O. P. HOYT.
PNEUMATIC TIRE.
APPLICATION FILED FEB. 8, 1917.

1,231,612.

Patented July 3, 1917.

INVENTOR
Osmon P. Hoyt
BY
Edwards, Sager & Richmond
ATTORNEYS

UNITED STATES PATENT OFFICE.

OSMON P. HOYT, OF MONROE, NEW YORK.

PNEUMATIC TIRE.

1,231,612.　　　　Specification of Letters Patent.　　Patented July 3, 1917.

Application filed February 8, 1917. Serial No. 147,294.

*To all whom it may concern:*

Be it known that I, OSMON P. HOYT, a citizen of the United States, residing at Monroe, in the county of Orange and State of New York, have invented certain new and useful Improvements in Pneumatic Tires, of which the following is a specification.

This invention relates to pneumatic tires and resides particularly in the provision of a tire wherein the air is contained in a plurality of parts or sections around the periphery of the wheel.

An object of the invention is to avoid the defects of the usual pneumatic tire having a single air chamber and to so construct the tire that a puncture at one part of it will not affect the remainder.

Another object of the invention is to so construct the tire that the different parts or sections will be unified around the periphery of the wheel in order that a change of pressure in one section will be received and transmitted to the neighboring section. In this way the sectional tire distributes the pressure, due to an obstruction in the road, like the ordinary pneumatic tire having a single air chamber.

A further object of the invention is to make the various sections of the tire removable and replaceable so that each part of the tire may be renewed without disturbing the rest of the tire.

In the accompanying drawings.

Figure 1:
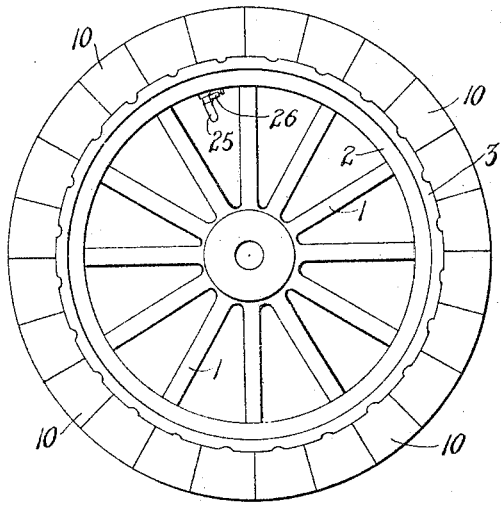
Figure 1 is a side elevation of a wheel provided with a tire embodying my invention.
Figure 2:
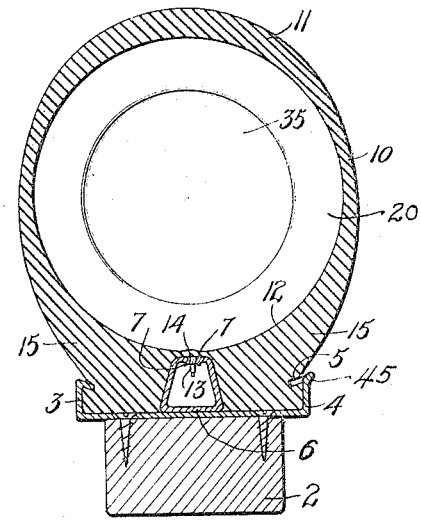
Fig. 2 is a sectional view of the tire.

In the drawings, 1 represents a wheel having its felly 2 provided with a rim 3 constructed in accordance with this invention and comprising a part 4 fastened to the felly of the wheel and having bent over edges 5 to hold the sections of the tire in place in alinement. At the center of this section 4 is fastened the metal air tube or ring 6 provided with the peripheral apertures 7 to receive the valves or nipples of the tire sections, there being a recess for each tire section and preferably about twenty-four sections to a tire.

The ring 3 is continuous around the periphery of the wheel and the tire sections or bulbs 10 are assembled in series in this rim. Each bulb comprises a tire tread portion 11 continuous with an inner wall 12 which carries the nipple 13 having a valve 14 within it allowing air to enter the tire section and holding it therein. Each side of the inner wall 12 is thickened as at 15 to fit against the central air ring 6 and lock underneath the overhanging edge 5 of rim part 4. Each section or bulb 10 is provided with end walls 20 and all the walls of these sections are of sufficient strength and rigidity to sustain the required pneumatic pressure within.

The air pressure for all the sections or bulbs 10 is received from the common air ring or passage 6 through valve 14 of each tire section. The air for the rim 6 is provided through a valve stem 25 which may be of any ordinary construction and, in addition to the usual valve, is provided with a pressure limiting cylinder 26 slotted at 27 and carrying the sliding cup 28 within it having slot 29 therein adapted to be moved into register with slot 27 when the pressure within the chamber 6 extends a certain maximum. When the slots 29 and 27 are in register they will afford a passage from the interior of the valve stem to the air and will prevent any higher pressure being developed within the ring. In order to regulate the pressure at which the slots will be moved into register, the outer end of the cylinder 26 is provided with the spring 30 adjustable in tension by the thumb nut 31 screw-threaded into the head of the cylinder 26 to vary the position of the cap 32 over the spring 30. By this means the permissible pressure within the tire can be regulated and set at a certain value which cannot be exceeded.

In operation, all the tire sections or bulbs 10 are assembled around the periphery of the wheel and within the locking means of the rim, each nipple 13 being within its corresponding recess 7 of the air ring 6. As air is forced through stem 25, the pressure in the ring 6 will rise and each section will be inflated through its valve 14. When the maximum pressure is reached, the pressure limiting cylinder 26 will have its slots 27 and 29 in register to blow off any excess of air and confine the pressure within the ring 6 and sections or bulbs 10 below a certain value.

The inflation of each section causes its side portions 15 to become locked within the rim and presses its nipple 13 into sealing engagement with the walls of its recess 7. As the ends of the sections as assembled are substantially in contact with each other, the inflation of the tire will press all the section ends against each other, binding the whole into a unitary construction having a continuous peripheral tread. In order to transmit the pressure of each section or bulb to its neighbors, each end wall is preferably thinned out at its center as 35 to form a resilient diaphragm or air drum and unifier. When any section is compressed by a bump or obstruction on the road, the raised pressure within that section will expand the air drums or unifiers at each end into convex form protruding into each adjacent section and if the consequent rise in pressure in these adjacent sections is sufficient the resilient diaphragms at their opposite ends will also be expanded to project into the next adjacent sections and so on around the tire. In this manner any compression of a given section is transmitted in effect around the tire and the whole tire is unified in resiliency. The expansion of the resilient diaphragms of a compressed section will expand them into the adjacent sections and form a lock preventing relative lateral shifting between the sections and holding them all in longitudinal alinement. It is apparent that the abutting ends of the sections may have their mating faces provided with mating recesses and protuberances interlocking to prevent relative lateral movement between the sections and maintain a continuous, smooth periphery for the tire.

Figure 3:
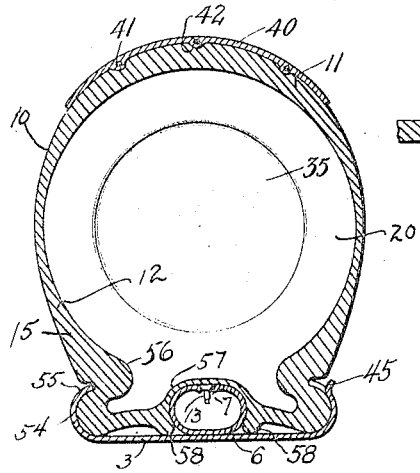
Fig. 3 is a sectional view of a modified form.
Figures 4, 5:
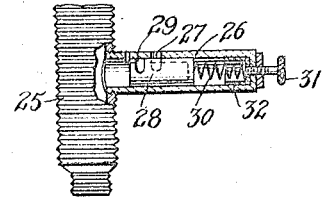
Figs. 4 and 5 are partial sectional views of details.
Figure 6:
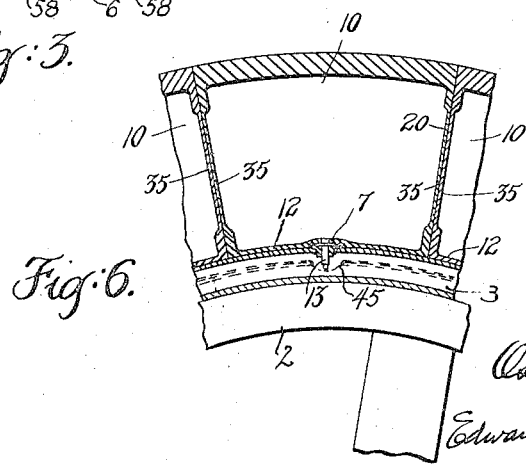
Fig. 6 is a longitudinal sectional view of one of the tire sections in place on the rim.

In the modified construction shown in Fig. 3, the tire is provided with a removable tread portion 40 which may be armored or stiffened in any desirable manner and is anchored in place by the ribs 41 engaging in the peripheral grooves 42 in the peripheries of the bulbs or sections 10. This tread 40 does not only take up the wear from the resilient sections beneath, but will serve to hold said sections in alinement and prevent the lodgment of particles of grit and stone between the sections of the tire. In this modified form of construction, the rim anchorage comprises the curved side flanges 54 and overhangs 55. The thickened sides of the inner walls 12 are curved to follow the contour of the locking means, as shown at 56, and are provided with the connecting resilient bridge lock 57 which is expanded by pressure within the tire to bring its feet 58 into contact with the rim 6 as shown. Upon deflation of the tire section this locking means is easily disengaged by pressing against the side of the section, the feet 58 pressing the bridge 57 upward to fold it in between the sides and allow the sides to be released from the locking means.

It is apparent that in case of the puncture or deflection of any section of the tire the remaining sections are unaffected. To repair the tire it is only necessary to remove the defective section, replace it by another section, and pump up the newly inserted section through air ring 6. Due to the small portion of the tread taken up by each section the failure of a single section will not necessitate immediate repair, but the driver of the vehicle may proceed to his destination before replacing the deflated bulb. With the air exhausted from the bulbs their insertion or removal is simple, quick and easy.

The operator has but to press the new section into its place with the inner side 15 within the inner flange lock 5, insert nipple 13 in its recess 7, and then press the outer side 15 within its flange lock. To expedite removal of these sections, the flange 5 is preferably provided with the bent over cut away portion 45 to allow the point of the tool to be inserted underneath the edge 15 of the tire section.

By this invention the use of inner tubes is entirely dispensed with and the vehicle need not be provided with extra tires, but only with a few extra sections or bulbs. The air ring and stem are fixtures on the wheel never requiring any removal at all. Except in case of the serious puncture of a number of adjacent sections the tire will not be injured so that the vehicle cannot proceed to its destination without further injury to the tire.

It is apparent that the rim or sections may be provided with means to keep the sections of the tire in close alinement. The invention is not confined to the specific embodiment herein described but is intended to cover such modifications thereof as fall within the scope of the appended claims.

Having thus described my invention, I declare that what I claim as new and desire to secure by Letters Patent, is:—

1. A pneumatic tire comprising a plurality of separate single tube sections adapted to be arranged in series around the periphery of the wheel and having their abutting ends pressed into contact by the air pressure within said sections, an annular anchorage for said sections and a peripheral tread ring surrounding said sections and comprising a broad flat tread trip having means on its inner surface engaging said sections to retain said ring against lateral movement and hold said sections in alinement.

2. A pneumatic tire formed by a plurality of single tube tread sections adapted to contain air under pressure and having abutting ends in contact and their surfaces in alinement to form a continuous circular periphery, an annular anchorage for said sections coextensive with the felly of the wheel and comprising a circular air tube connected to each of said sections to supply air thereto, and means coöperating with said air ring to lock the sections in place on the wheel felly and hold them against lateral displacement.

3. The combination with a pneumatic tire comprising a series of single tube air bulbs substantially cylindrical in form and having flat abutting ends pressed into contact by the air pressure within them, of an annular anchorage for said sections comprising a rigid circular air tube connected to each of said sections to supply the air thereto, and means coöperating with said air tube for locking the sections on the wheel felly and holding said sections in lateral alinement, portions of said sections being locked around said air tube by the pneumatic pressure within them and permitting detachment of any section from said anchorage upon release of the pneumatic pressure within said section.

4. The combination with a pneumatic tire comprising a plurality of single tube air bulbs adapted to be arranged in series around the circumference of a wheel and alined to form a continuous circular periphery, of an annular anchorage for said sections comprising a rigid circular air tube connected to each of said sections to supply air thereto, and means coöperating with said air tube for holding the sections in alinement on the wheel felly, portions of said sections being locked around said air tube by the pneumatic pressure within them and permitting detachment of any section from said anchorage upon release of the pneumatic pressure within said section.

5. The combination with a pneumatic tire comprising a series of sections each adapted to independently contain air under pressure, of an annular anchorage for said sections comprising a rigid circular air tube connected to each of said sections to supply the air thereto, and a valve between each section and said air tube to retain air in each section independently of the pressure in said tube, portions of said sections being locked around said air tube by the pneumatic pressure within them and permitting detachment of any section from said anchorage upon release of the pneumatic pressure within said section.

OSMON P. HOYT.